US006567866B1

(12) United States Patent
Poisner

(10) Patent No.: US 6,567,866 B1
(45) Date of Patent: May 20, 2003

(54) SELECTING MULTIPLE FUNCTIONS USING CONFIGURATION MECHANISM

(75) Inventor: David I. Poisner, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,533

(22) Filed: Dec. 30, 1999

(51) Int. Cl.[7] .................................................. G06F 3/00
(52) U.S. Cl. ........................ 710/36; 710/5; 710/18
(58) Field of Search ............................. 710/1, 5, 36, 62, 710/65, 104, 101, 131, 8, 10, 81, 2, 3, 7, 12, 18, 19, 40, 72, 119, 37; 713/1; 712/15, 29

(56) References Cited

U.S. PATENT DOCUMENTS

| 5,450,557 A | * | 9/1995 | Kopp et al. ................. 395/375 |
| 5,596,765 A | * | 1/1997 | Baum et al. ................... 712/1 |
| 5,664,197 A | | 9/1997 | Kardach et al. ............. 395/728 |
| 5,862,387 A | | 1/1999 | Songer et al. ............... 395/728 |
| 5,886,537 A | * | 3/1999 | Macias et al. ................. 326/40 |
| 6,181,788 B1 | * | 1/2001 | Miloslavsky ................. 379/219 |
| 6,204,989 B1 | * | 3/2001 | Hirinya et al. ........... 360/77.06 |
| 6,314,479 B1 | * | 11/2001 | Fredrick et al. ............... 710/63 |

* cited by examiner

Primary Examiner—Jeffrey Gaffin
Assistant Examiner—Rijue Mai
(74) Attorney, Agent, or Firm—Blakely, Sokoloff, Taylor & Zafman LLP

(57) ABSTRACT

The present invention is a method and apparatus to provide multifunction to a device. A selector selects one of first and second functionalities based on a control setting. The selected one of the first and second functionalities is accessible at a pin of the device. A configuration mechanism is coupled to the selector to provide the control setting.

24 Claims, 4 Drawing Sheets

US 6,567,866 B1

SELECTING MULTIPLE FUNCTIONS USING CONFIGURATION MECHANISM

BACKGROUND

1. Field of the Invention

This invention relates to microprocessors. In particular, the invention relates to multifunction signals.

2. Description of Related Art

As demands for advanced features of microprocessor systems increase, system manufacturers face a challenging task to integrate as many functionalities as possible with lowest cost and highest performance. One of the common problems of system manufacturers is the need for flexibility in integrating devices into several platforms or environments.

Popular platforms or bus architectures include Peripheral Component Interconnect (PCI) and Industry Standard Architecture (ISA) buses. The PCI specification is provided by the Intel PCI Local Bus Specification Revision 2.2 published in February 1999. The PCI bus is a high performance bus that is intended as an interconnect mechanism between highly integrated peripheral controller components, peripheral add-in boards, and processor/memory subsystems. The ISA bus is a popular bus for lower bandwidth devices or peripheral components. Many platforms provide bus architectures that incorporate both types of bus. Interfacing devices, such as PCI-to-ISA bridge, exist to allow interfacing between the two buses. A peripheral device may have interface to both buses.

It is preferable that a peripheral device or processor provides functionalities that are flexible to a variety of personal computer (PC) manufacturers. Traditional techniques provide the different functionalities in different and separate pins. For example, a signal or pin is dedicated for one platform and another signal or pin is dedicated for another platform. This technique has a number of disadvantages. First, separate signals or pins increase pin count, resulting in complexity in packaging. Second, it reduces flexibility for PC manufacturers when the device or processor is integrated in different platforms.

Therefore, there is a need to have a multifunction functionality that is easy to use and flexible for PC manufacturers.

SUMMARY

The present invention is a method and apparatus to provide multifunction to a device. A selector selects one of first and second functionalities based on a control setting. The selected one of the first and second functionalities is accessible at a pin of the device. A configuration mechanism is coupled to the selector to provide the control setting.

BRIEF DESCRIPTION OF THE DRAWINGS

The features and advantages of the present invention will become apparent from the following detailed description of the present invention in which.

DESCRIPTION

The present invention is a method and apparatus to provide multifunction to a device. A selector selects one of first and second functionalities based on a control setting. The selected one of the first and second functionalities is accessible at a pin of the device. A configuration mechanism is coupled to the selector to provide the control setting.

The pin is one of an output pin and an input pin. When the pin is an output pin, the selector is a multiplexer. When the pin is an input pin, the selector is a de-multiplexer. The multiplexer has first and second multiplexer inputs corresponding to the first and second functionalities, respectively, and a multiplexer output corresponding to the output pin. The multiplexer transfers one of the first and second multiplexer inputs to the multiplexer output based on the control setting. The de-multiplexer has first and second de-multiplexer outputs corresponding to the first and second functionalities, respectively, and a de-multiplexer input corresponding to the input pin. The de-multiplexer transfers the de-multiplexer input to one of the first and second de-multiplexer outputs based on the control setting.

The configuration mechanism may be implemented by a configuration field in a configuration register or a strapping connection. The configuration field is programmable by an initialization procedure or by a Basic Input/Output System (BIOS) firmware. The strapping connection is set by an external connection to a logic level.

In one embodiment, the first functionality is one of a peripheral component interconnect (PCI) bus request and grant, and the second functionality is one of a PC/PCI direct memory access (DMA) request and grant.

The advantages of the multifunction circuit include saving in pin-count, increased board design flexibility, and novel multifunction usage.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
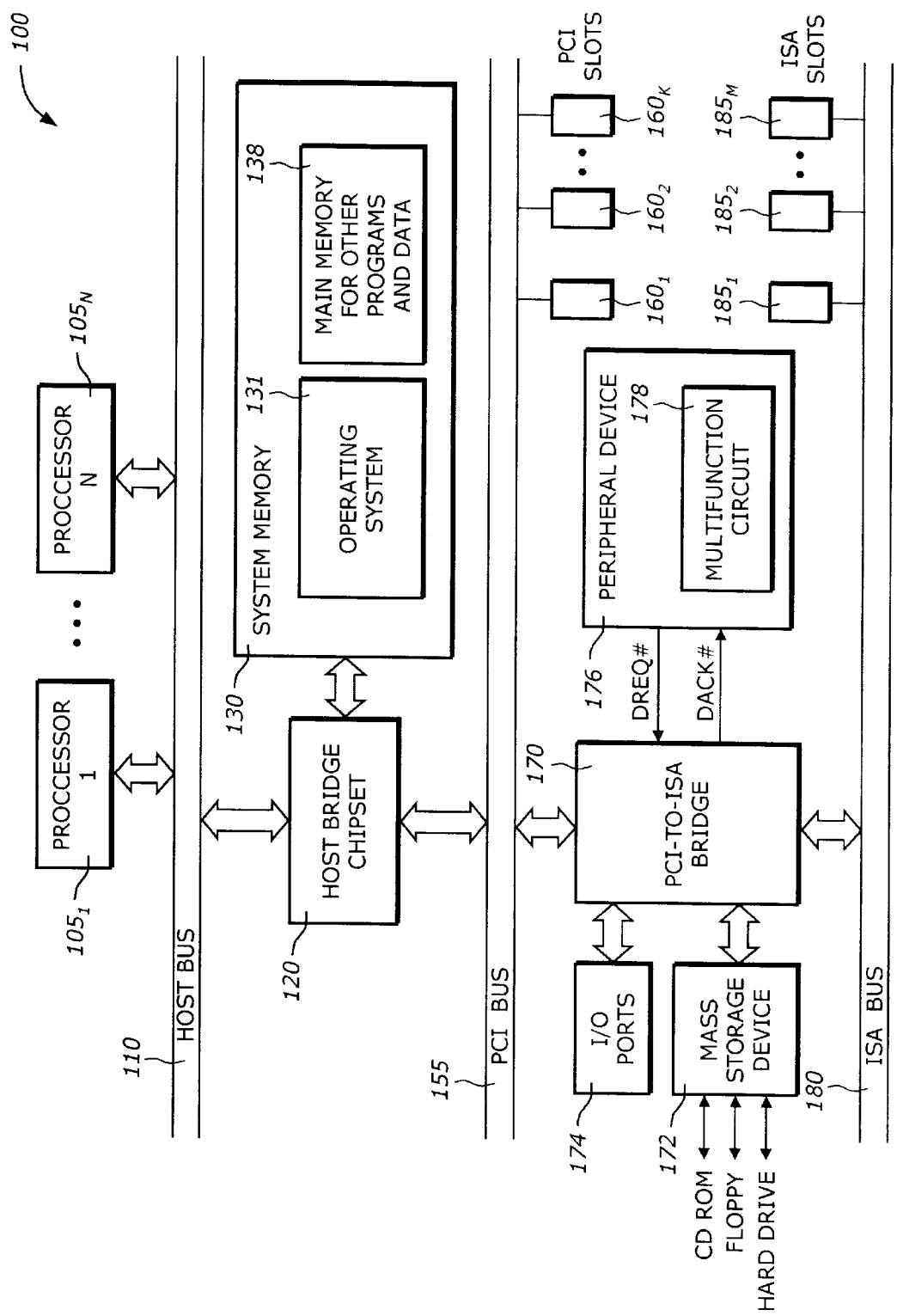
FIG. 1 is a diagram illustrating a computer system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge chipset 120, a system memory 130, a primary PCI bus #0 155, K PCI slots $160_1$ to $160_K$, a PCI-to-ISA bridge 170, mass storage devices 172, Input/Output (I/O) ports 174, a multifunction device 176, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 120 includes a number of interface circuits to allow the host processors $105_1$ to $105_N$ access to the system memory 130, the graphics processor 140, and the PCI bus 155. The system memory 130 represents one or more mechanisms for storing information. For example, the system memory 130 may include non-volatile or volatile memories. Examples of these memories include flash memory, read only memory (ROM), or random access memory (RAM). The system memory 130 is loaded with an operating system (OS) 131, and other programs and data 138. Of course, the system memory 130 preferably contains additional software (not shown), which is not necessary to understanding the invention.

The PCI bus 155 may be a primary or a secondary bus in the system. The PCI slots $160_1$ to $160_K$ provide interfaces to PCI devices. Examples of PCI devices include the network interface and the media interface. The network interface connects to communication channel such as the Internet. The Internet provides access to on-line service providers, Web browsers, and other network channels. The media interface provides access to audio and video devices.

The PCI-to-ISA bridge 170 provides access to the ISA bus 180, mass storage devices 172, and I/O ports 174. The PCI-to-ISA bridge 170 provides interface between the PCI bus 155 and the ISA bus 180. An example of the PCI-to-ISA bridge 170 is the Intel 82380AB, manufactured by Intel Corporation. The 82380AB device specification is described in the data sheet "Intel 380FB PCISET: 82380AB Mobile PCI-to-ISA bridge (MISA)", published by Intel Corporation, 1997. The mass storage devices 172 include CD ROM, floppy diskettes, and hard drives. The peripheral device 176 has signal pins with multiple functionalities. The peripheral device 176 has a multifunction circuit 178 to provide multifunction to the signal pins of the peripheral device 176. In the example shown in FIG. 1, the device 176 has a direct memory access (DMA) Request (REQ#) and Acknowledgment (ACK#) pair configured to interface to the PCI-TO-ISA bridge 170. The peripheral device 176 can also be configured to interface to the PCI bus 155 using a control setting. The ISA bus 180 has a number of ISA slots $185_1$, to $185_M$ to interface to ISA devices. Examples of ISA devices include data entry devices (e.g., keyboard, mouse), printers, etc.

Figure 2:
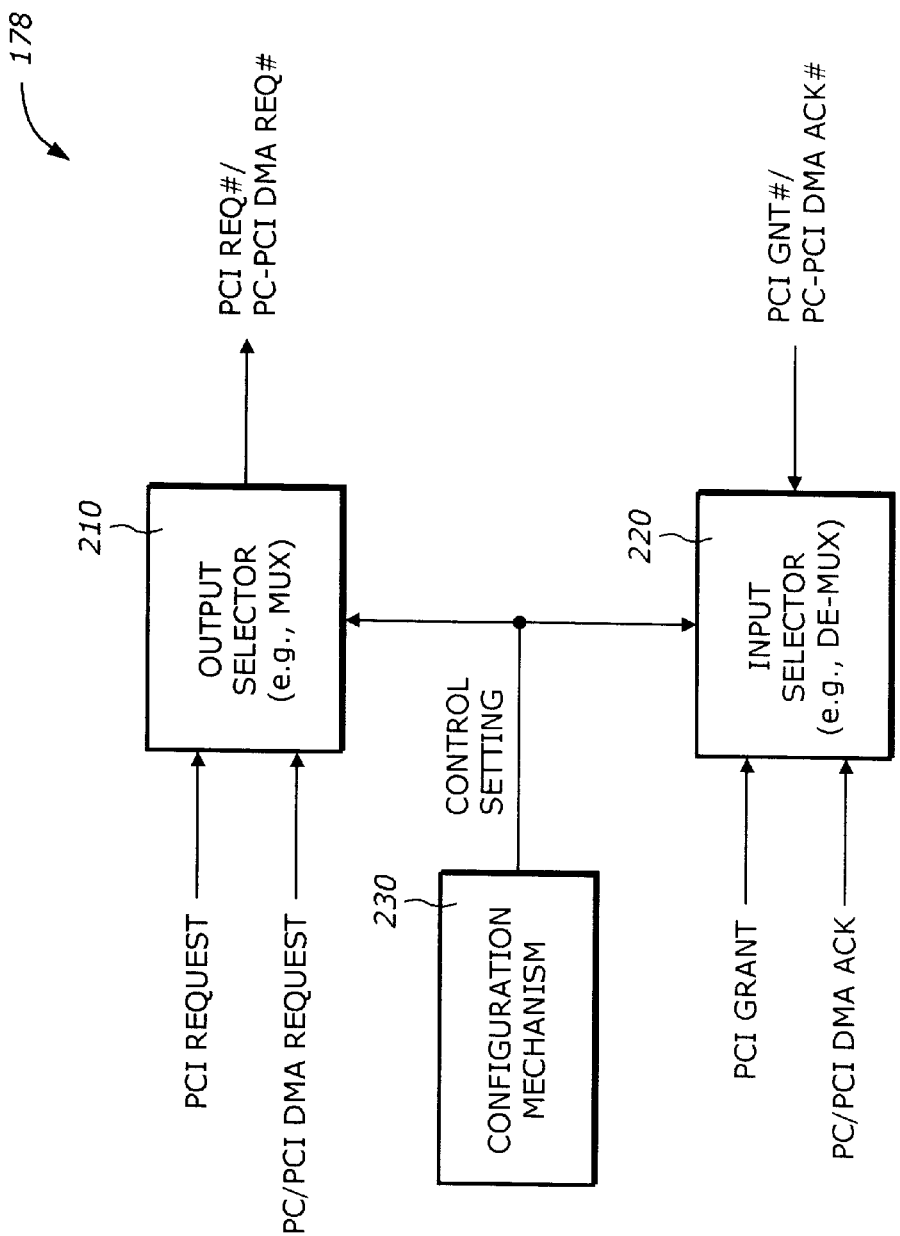
FIG. 2 is a diagram illustrating a multifunction circuit according to one embodiment of the invention.

FIG. 2 is a diagram illustrating a multifunction circuit 178 according to one embodiment of the invention. The multifunction circuit 178 includes an output selector 210, an input selector 220, and a configuration mechanism 230.

The output selector 210 selects one of a first output functionality and a second output functionality and transfers the selected functionality to the output signal pin. In one embodiment, the output selector 210 is a multiplexer. The first output functionality is a PCI request (REQ#), and the second output fucntionality is a PC/PCI DMA request (REQ#). The output signal pin has a dual function corresponding to the two output functionalities, namely, PCI REQ# and PC/PCI DMA REQ#. The output selector 210 is controlled by a control setting provided by the configuration mechanism 230.

The input selector 220 transfers the input signal pin to one of first input functionality and second input functionality. In one embodiment, the input selector 220 is a demultiplexer with appropriate signal gating circuitry and/or buffering. The first input functionality is a PCI grant (GNT#) and the second input functionality is a PC/PCI DMA acknowledgment (ACK#). The input signal pin has a dual function corresponding to the two input functionalities, namely, PCI GNT# and PC/PCI DMA ACK#. The input selector 220 is controlled by a control setting provided by the configuration mechanism 230.

The configuration mechanism 230 generates the control setting to control the selection of the functionalities based on the desired configuration of the device 176 (FIG. 1) used in a particular platform. The implementation of the configuration mechanism 230 is shown in FIGS. 3A and 3B.

The multifunction circuit 178 provides multiple functions to the signal pin pair PCI REQ#/PC-PCI DMA REQ# and PCI GNT#/PC-PCI DMA ACK#. As is known by one skilled in the art, the multifunction circuit 178 can provide more than two functionalities to more than two signal pins. The two signal pairs have similar functionalities and electrical characteristics and therefore are easily integrated into a single device. This allows flexibility for a PC manufacturer to incorporate the device into different platforms. For example, the PC manufacturer may use the pair of signals to allow for an additional PCI bus master or for a PCI DMA device. In addition, the device can be dynamically configurable by configuring the configuration mechanism 230 accordingly. In this application, the device can perform a DMA request if it is emulating an ISA DMA device, or to perform standard PCI bus master requests if it is operating as an advanced bus master.

Figure 3A:
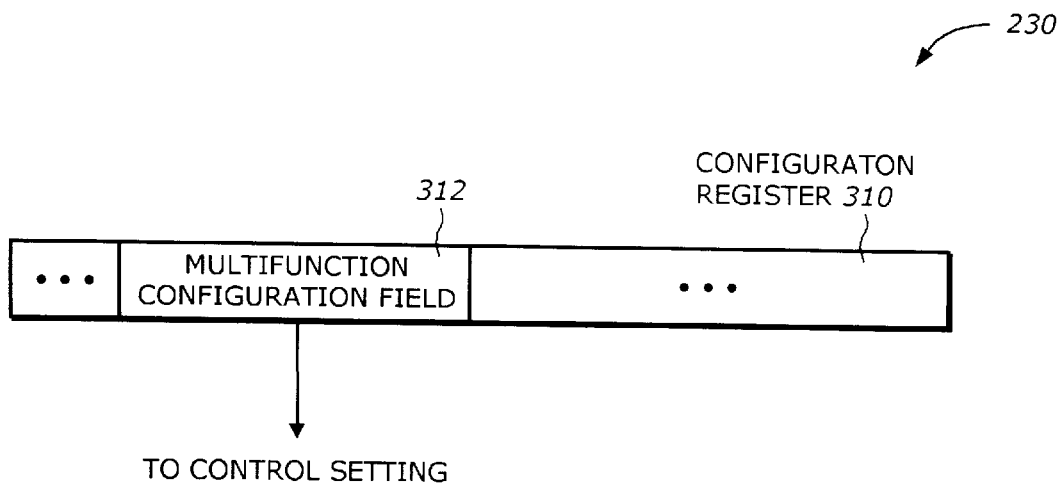
FIG. 3A is a diagram illustrating a configuration register according to one embodiment of the invention.
Figure 3B:
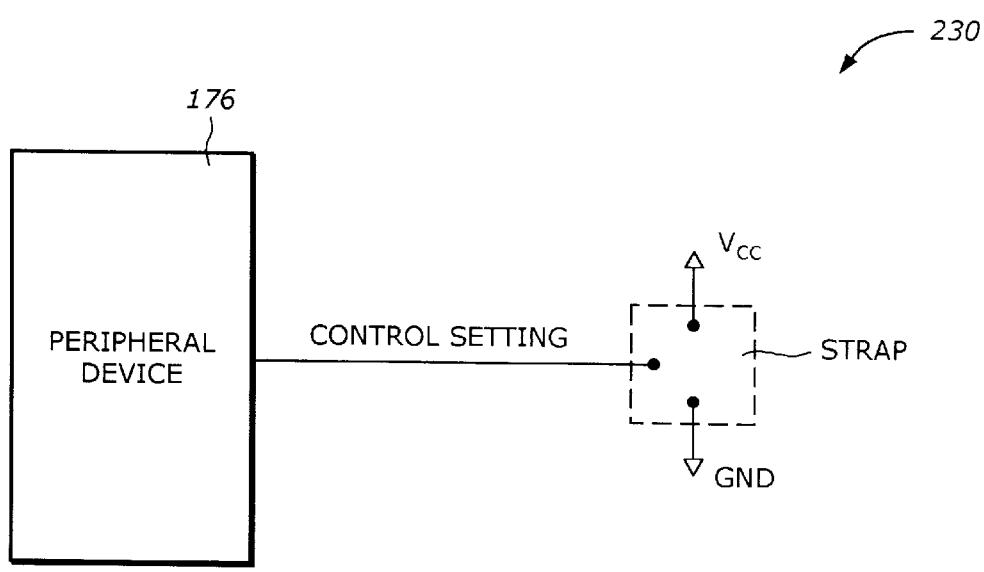
FIG. 3B is a diagram illustrating a strap according to one embodiment of the invention.

FIG. 3A is a diagram illustrating a configuration register to implement the configuration mechanism 230 shown in FIG. 2 according to one embodiment of the invention. The configuration mechanism 230 includes a configuration register 310.

The configuration register 310 is a register containing configuration fields. One of the configuration fields is a multifunction configuration field 312. The multifunction configuration field 312 provides the control setting to the selectors 210 and 220 shown in FIG. 2. For two functionalities, the configuration field 312 is reduced to a configuration bit. The configuration field 312 is programmable by software. The software may be a piece of code as part of an initialization or set-up procedure or routine provided by the manufacturer. The configuration software may also be part of a Basic Input/Output System (BIOS) residing in a boot-up firmware.

FIG. 3B is a diagram illustrating a strap to implement the configuration mechanism 230 shown in FIG. 2 according to one embodiment of the invention.

The control setting is available as an external pin that can be strapped into one of two logic levels. The logic levels include a low level, corresponding to the ground (GND) level, and a high level, corresponding to the supply (VCC) level. The strap can be implemented by a jumper connecting the control setting pin to one of the logic levels. Alternatively, the strap can be provided by a programmable control bit from a programmable register.

Figure 4:
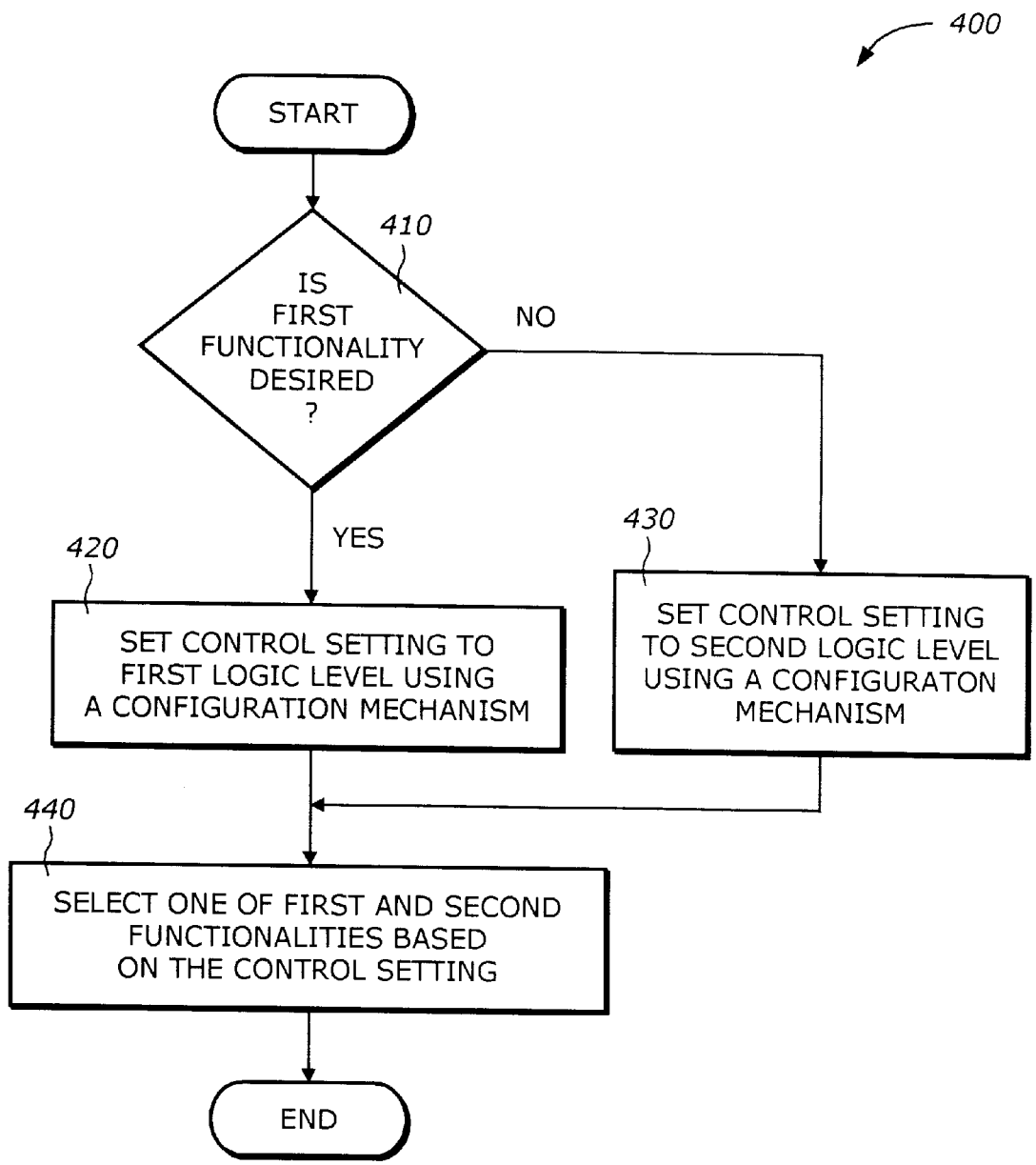
FIG. 4 is a flowchart illustrating a process to provide multifunction to a device according to one embodiment of the invention.

FIG. 4 is a flowchart illustrating a process 400 to provide multifunction to a device according to one embodiment of the invention.

Upon START, the process 400 determines if the first functionality is desired (Block 410). If so, the process 400 sets the control setting to a first logic level using the configuration mechanism shown in FIG. 3A or 3B (Block 420). Otherwise, the process 400 sets the control setting to a second logic level using the configuration mechanism shown in FIG. 3A or 3B (Block 430).

Then, the process 400 selects one of the first and second functionalities based on the control setting as set by the configuration mechanism (Block 440). The process 400 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a selector to select one of first and second functionalities based on a control setting, the selected one of the first and second functionalities being accessible at a pin of a device, the pin being one of an output pin and an input pin, the selector comprising:
   a de-multiplexer having first and second de-multiplexer outputs corresponding to the first and second functionalities, respectively, and a de-multiplexer input corresponding to the input pin, the de-multiplexer transferring the de-multiplexer input to one of the first and second de-multiplexer outputs based on the control setting; and
   a configuration mechanism coupled to the selector to provide the control setting.

2. The apparatus of claim 1 wherein the selector further comprises:
   a multiplexer having first and second multiplexer inputs corresponding to the first and second functionalities, respectively, and a multiplexer output corresponding to the output pin, the multiplexer transferring one of the first and second multiplexer inputs to the multiplexer output based on the control setting.

3. The apparatus of claim 1 wherein the configuration mechanism is one of a configuration field in a configuration register and a strapping connection.

4. The apparatus of claim 3 wherein the configuration field is programmable.

5. The apparatus of claim 4 wherein the configuration field is programmable by a Basic Input/Output System (BIOS) firmware.

6. The apparatus of claim 3 wherein the strapping connection is set by an external connection to a logic level.

7. The apparatus of claim 1 wherein the first functionality is one of a peripheral component interconnect (PCI) bus request and grant.

8. The apparatus of claim 7 wherein the second functionality is one of a PC/PCI direct memory access (DMA) request and acknowledgment.

9. A method comprising:
   providing a control setting by a configuration mechanism; and
   selecting one of first and second functionalities by a selector based on the control setting, the selected one of the first and second functionalities being accessible at a pin of a device, the pin being one of an output pin and an input pin, the selecting comprising,
   transferring a de-multiplexer input of a de-multiplexer to one of first and second de-multiplexer outputs based on the control setting, the first and second de-multiplexer outputs corresponding to the first and second functionalities, respectively, the de-multiplexer input corresponding to the input pin.

10. The method of claim 9 wherein selecting further comprises:
    transferring one of first and second multiplexer inputs of a multiplexer to a multiplexer output based on the control setting, the first and second multiplexer inputs corresponding to the first and second functionalities, respectively, the multiplexer output corresponding to the output pin.

11. The method of claim 9 wherein the configuration mechanism is one of a configuration field in a configuration register and a strapping connection.

12. The method of claim 11 wherein the configuration field is programmable.

13. The method of claim 12 wherein the configuration field is programmable by a Basic Input/Output System (BIOS) firmware.

14. The method of claim 11 wherein the strapping connection is set by an external connection to a logic level.

15. The method of claim 9 wherein the first functionality is one of a peripheral component interconnect (PCI) bus request and grant.

16. The method of claim 15 wherein the second functionality is one of a PC/PCI direct memory access (DMA) request and acknowledgment.

17. A system comprising:
    a bus; and
    a device coupled to the bus, the device having a circuit to provide multifunction to the device, the circuit comprising:
    a selector to select one of first and second functionalities based on a control setting, the selected one of the first and second functionalities being accessible at a pin of the device, the pin being one of an output pin and an input pin, the selector comprising:
    a de-multiplexer having first and second de-multiplexer outputs corresponding to the first and second functionalities, respectively, and a de-multiplexer input corresponding to the input pin, the de-multiplexer transferring the de-multiplexer input to one of the first and second de-multiplexer outputs based on the control setting, and a configuration mechanism coupled to the selector to provide the control setting.

18. The system of claim 17 wherein the selector further comprises:
    a multiplexer having first and second multiplexer inputs corresponding to the first and second functionalities, respectively, and a multiplexer output corresponding to the output pin, the multiplexer transferring one of the first and second multiplexer inputs to the multiplexer output based on the control setting.

19. The system of claim 17 wherein the configuration mechanism is one of a configuration field in a configuration register and a strapping connection.

20. The system of claim 19 wherein the configuration field is programmable.

21. The system of claim 20 wherein the configuration field is programmable by a Basic Input/Output System (BIOS) firmware.

22. The system of claim 19 wherein the strapping connection is set by an external connection to a logic level.

23. The system of claim 17 wherein the first functionality is one of a peripheral component interconnect (PCI) bus request and grant.

24. The system of claim 23 wherein the second functionality is one of a PC/PCI direct memory access (DMA) request and acknowledgment.

* * * * *